Feb. 20, 1962 W. R. SEIGLE 3,022,501

DRAWING TAPE PROGRAMMER

Filed May 28, 1956 2 Sheets-Sheet 1

INVENTOR:
WILLIAM R. SEIGLE,

BY Michael Masnik
HIS AGENT.

Feb. 20, 1962

W. R. SEIGLE 3,022,501

DRAWING TAPE PROGRAMMER

Filed May 28, 1956

2 Sheets-Sheet 2

INVENTOR:
WILLIAM R. SEIGLE,

BY Michael Masnik

HIS AGENT.

United States Patent Office 3,022,501

Patented Feb. 20, 1962

3,022,501

DRAWING TAPE PROGRAMMER

William R. Seigle, New Hartford, N.Y., assignor to General Electric Company, a corporation of New York Filed May 28, 1956, Ser. No. 587,552
7 Claims. (Cl. 340—365)

This invention relates to the art of programming point-to-point the motions of random path operating equipments and more particularly to the art of deriving digitally coded programming information from analog drawings for use in control of point-to-point operating machines.

With the advent of automatic machinery, particularly machinery used for point-to-point operation, programming or automatic control of sequential operation has become increasingly important. With machines operating from point-to-point with random path motions, such as eyelet placing machines, punch presses, pin placing machines and automatic shearing machines, the use of a grid of predetermined increments has become widespread.

A grid which has reached widespread popularity is the "0.1-inch grid." With this grid, movement along coordinate axes is controlled in 0.1-inch increments. The axes are selected so that the combined controlled movement along the individual axis will locate a point at the intersection of the grid lines over the entire work surface. An advantage in the use of such a grid arrangement is that each intersection can be designated by a non-ambiguous digital number.

However, graphical displays such as engineering drawings are still produced in analog form, i.e., a scale or an exact reproduction of the dimensions of the finished product. The existing problem has been to transform the analog dimensions of engineering drawings into a digitally coded programming means for use in control of automatic equipment.

To solve the problem of deriving data from graphs, charts or drawings and putting them into mechanically reproducible forms, such as punched cards, punched tape and magnetic tape, the prior art has resorted to relatively complex electronic computors.

It is one object of my invention to eliminate the complexity of such transformation devices.

It is a further object of my invention to provide a method and means for transforming information contained in an engineering drawing to a punch tape suitable for programming point-to-point operating equipment.

It is a further object of my invention to convert analog information to mechanically reproducible form.

It is a further object of my invention to provide method and means for transforming analog information into digitally coded programming information.

An analog to digital converter constructed in accordance with one embodiment of the present invention comprises an incremental grid which can be superimposed upon the drawing containing analog information. A stylus moveable to any point on the grid is tracked along orthogonal coordinates. When the stylus is depressed at the selected grid intersection, binary coded switches in both orthogonal coordinates will transmit the coordinate position in binary form to suitable reproducing means. At the same time, control information for the operation of the machine is transmitted to the same programmer means.

In accordance with another embodiment, means are provided to allow a selection between several desirable operations and related actuating impulses.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which:

Figure 1:
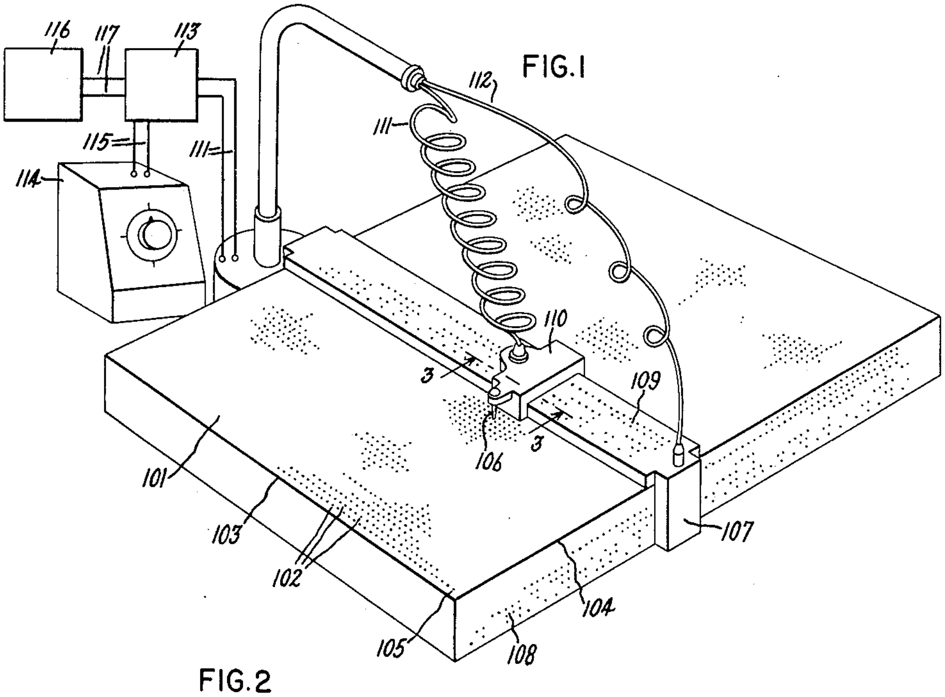
FIGURE 1 is a perspective view of an analog to digital converter in accordance with the present invention.

In FIGURE 1, there is shown a platform 101, with holes 102 laid out in a grid arrangement on its surface. The holes are arranged in rows parallel to the mutually perpendicular edges 103, 104 and each row is spaced apart by the desired incremental distance. For example, when the popular 0.1-inch incremental spacing is used, each row is spaced from the next by 0.1-inch, or a multiple thereof if drawings are drawn to an expanded scale. In the selection of the desired spacing, the practice of the user will govern. However, it has been found convenient, at times, to use an expanded scale of 2 to 1 for improved ease and accuracy when handling printed circuit boards. For larger items, a normal scale might be more easily handled.

One hole 105 is the reference hole denoting zero displacement along both axes. An analog drawing, reproducing the locations of points at which operations, such as pin insertions or hole punchings, are to be made, is placed on top of platform 101. A reference point on the drawing is placed over hole 105.

In order to reach each point on the drawing, a moveable styplus 106 is provided. The stylus is mounted so that it is moveable parallel to edge 103 by sliding along the traverse bar 107. The stylus is moveable parallel with edge 104 by movement of traverse bar, which is slideably mounted on platform 101.

Figure 2:
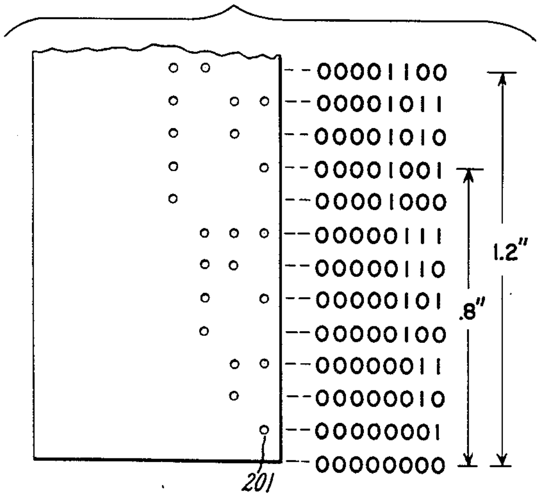
FIGURE 2 is a plan view of a portion of the apparatus shown in FIGURE 1.

To derive the binary coded equivalent of distance moved by the stylus in each coordinate, a binary coded scale is provided for each axis. Along edge 104, a binary scale 108 is provided. Similarly, binary scale 109 is provided to measure movement along the traverse bar 107. A section of the binary scale is shown in detail in FIGURE 2. Each column shown corresponds to a binary digit. A depression, 201, corresponds to a binary bit one (1); the absence of such a depression corresponds to the bit zero (0). A section of the scale, the equivalent binary representation, and illustrative decimal equivalents are shown in FIGURE 2.

Figure 3:
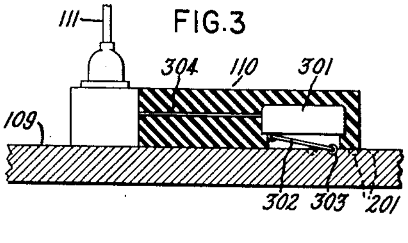
FIGURE 3 is a cross-sectional view of a portion of FIGURE 1 taken along lines 3—3.

Information of stylus movement along such coordinate axis is derived from the binary scales by operation of switches riding along each column or digit position and operated by the depressions. The operation of the switches may be more clearly seen by reference to FIGURE 3 which is a view along line 3—3 of FIGURE 1. In FIGURE 3 is shown one binary digit column with depressions, 201. A switch 301 is provided for each binary digit. The switch is a short throw switch which is closed when the operating lever 302 with an appropriate follower 303 falls into a depression 201.

By providing a switch 301 for each column of binary scale 108 and 109 of FIGURE 1, the binary coded information as to instantaneous position of the traverse arm 107 and the stylus carrier 110 is set up in the form of open and closed switch positions.

The information set up in the various switch positions is transmitted over connections which are gathered into cable 111. Leads 304 from the switches in the stylus carrier are directly combined into cable 111. The leads from switches in the traverse bar 107, FIGURE 1, are directly combined into cable 112.

To coordinate the transfer of the information stored in the switch positions, a programmer 113 is provided. The programmer also coordinates transfer of information from the operation selector 114 which contains a similar grouping of switches, the setting of which is made on the basis of a described operation, such as selection of hole size in a punch press, etc. The information in the operation selector is made available to the programmer over connection 115. The programmer coordinates the information and transmits it to readout apparatus 116 over connection 117. The readout apparatus can comprise a mechanism for punching tape or cards, or a magnetic recorder for recording on magnetic tape, etc. The programmer is actuated by depressing the stylus.

In order to ensure that the stylus is at a grid intersection when depressed, the stylus is so dimensioned that the programmer is not actuated until the stylus pierces the drawing placed on top of the platform 101 and seats in a hole 102 on the platform. To ensure that the address is not changed during programmed readout, the stylus is locked in the depressed position until readout is completed. These features together with the operation of the pragrammer may best be understood by reference to FIGURE 4.

Figure 4:
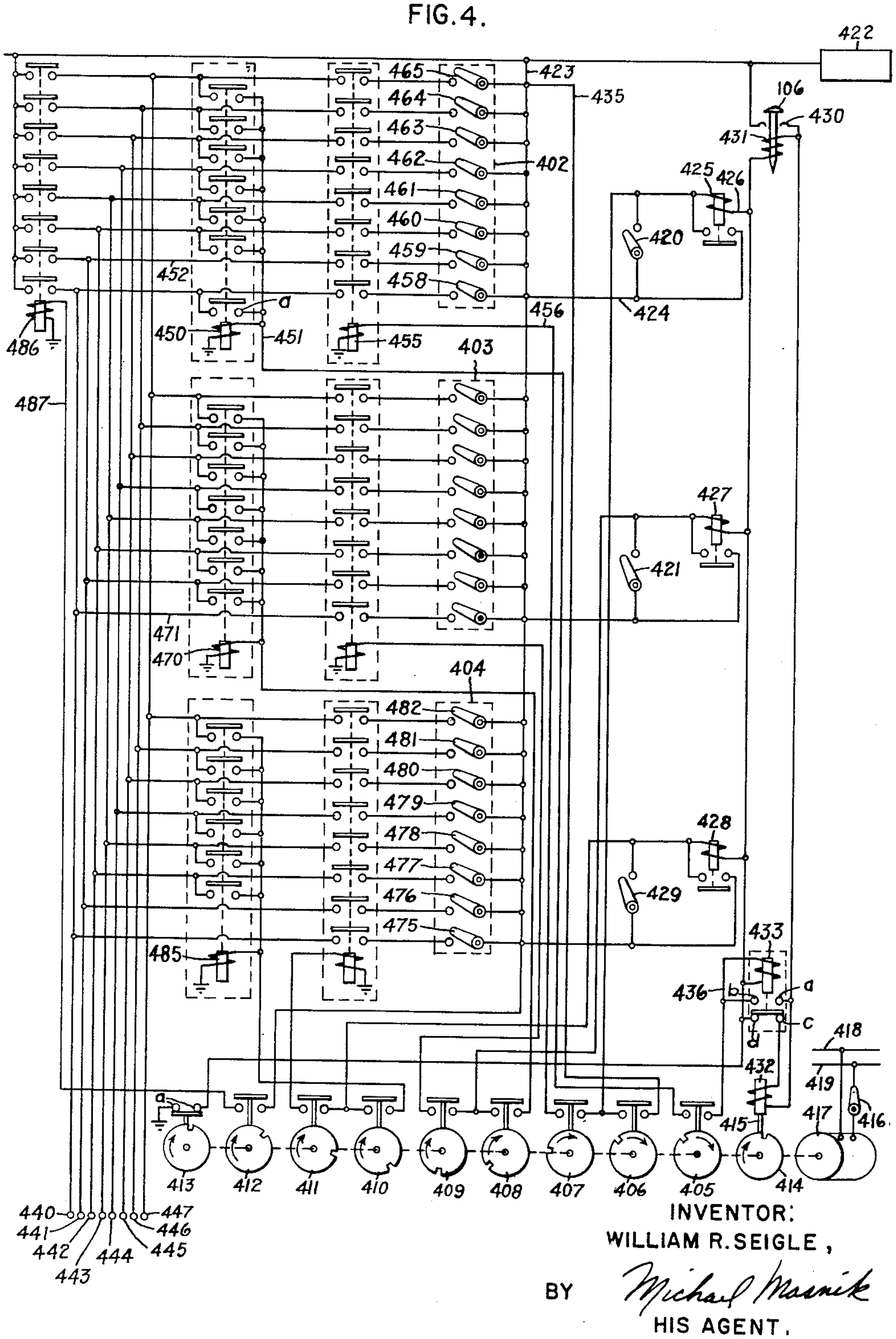
FIGURE 4 is a schematic diagram of the apparatus shown in FIGURE 1.

In FIGURE 4, there is shown the stylus 106, the group of switches 402 contained in the traverse bar, 107, FIGURE 1, the group of switches 403 contained in the stylus carrier 110, FIGURE 1, and the group of switches 404 contained in auxiliary equipment such as the operation selector 114, FIGURE 1. The programmer comprises cam section 405 to 413 which are driven through a single rotation clutch 414 when catch 415 is released. A main power switch 416 permits disconnection of the motor 417 from the power leads 418 and 419.

In operation, when the stylus 106 is moved to a new position along each coordinate, switches 420 and 421 close momentarily. These switches are tripping switches, mounted on the traverse bar and the stylus carrier respectively to make momentary contact if the stylus is moved. If the stylus does not move, contact will not be made. The momentary contact will supply operating power, derived from supply 422 over leads 423 and 424, to relay 425. The ground return for relay 425 is supplied through lead 426 and normaly closed contacts 413–*a*. When relay 425 closes, it is locked in position by its holding contacts. Similarly relays 427 and 428 will be locked down if movement caused switches 421 and 429 respectively to be momentarily closed.

When the stylus has reached the desired position, it is manually depressed, closing contacts 430. The closure supplies power to coils 431 and 432 and to contact *a* of relay 433. A ground return is supplied for coil 431 through connection 426 and normally closed contacts *a* of switch 413. Coil 431 holds the stylus in the depressed position to prevent change of switch settings until the programmer has completed its cycle.

At the same time, power, supplied to solenoid 432, lifts catch 415 to permit rotation of the single-rotation clutch. Since the catch must be released before completion of a cycle to prevent more than one cycle, the ground return is supplied through the normally closed contacts *c*, *d* of relay 433. As soon as the single rotation clutch has passed the latching position, power is supplied to close relay 433 through connections 435 and 436 and the normally open contacts of programmer section 405. Closure of relay 433 removes the ground from coil 432. The catch on the single rotation clutch drops back into position to stop the clutch after one complete revolution. The power supplied to terminal *a* of relay 433 holds the relay in the energized position until the information has been transferred out at which time it is reset by operation of programmer cam section 413.

The programmer cam sections will then complete one revolution to transfer the binary code switch settings of the groups of switches 402, 403 and 404 into usable form by means of output devices.

As mentioned in connection with the general discussion of the operation shown in FIGURE 1 the output device may be a tape punch machine. A common form of tape punch has a plurality of separately energized punches, which are simultaneously operated to punch a continuous paper tape. The operation of an individual punch is equivalent to the binary bit one (1). The output device could also be a magnetic tape recorder recording pulsed input on a plurality of paths. In both such devices, electrical impulses must be supplied to the output device. The output terminals of the programmer 440 through 447 must then be supplied with electric power which is transferred to the recording device by means of electric connections in accordance with the distance of the stylus from the reference along both axes. Since instructions concerning the positioning of the stylus are made available in digital form, it is advantageous in some applications to indicate which axis information is being transferred to the recording device. For this purpose relay 450 is provided. If relay 425 has been closed, indicating movement along this axis, power is supplied to relay 450 through the closed contacts of relay 425, through closed contacts of programmer section 406, and over connection 451. At the same time power is supplied to one side of each of the associated contacts operated by relay 450. Closure of relay 450 will then apply power to each of the lines connected to output terminals 440 through 447 except connection 452 which is connected to output terminal 441. This will cause the output recorder such as a tape punch to punch holes in all eight binary digit positions except the position associated with terminal 441. This operation indicates that the "X" address, or the movement of the stylus along edge 104 of the platform, shown in FIGURE 1, is about to be transferred to the output recorder. It will be apparent to those skilled in the art that the selection of a code for

*Table I*

| Distance moved (inches) | Digital equivalent (001-inch) bit, see also Fig. 2 | Switches (closed when checked) | | | | | | | | Terminal (powered when checked) | | | | | | | |
|---|---|---|---|---|---|---|---|---|---|---|---|---|---|---|---|---|---|
| | | 465 | 464 | 463 | 462 | 461 | 460 | 459 | 458 | 447 | 446 | 445 | 444 | 443 | 442 | 441 | 440 |
| 0.1 | 0000 0001 | | | | | | | | X | | | | | | | | X |
| 0.2 | 0000 0010 | | | | | | | X | | | | | | | | X | |
| 0.3 | 0011 | | | | | | | X | X | | | | | | | X | X |
| 0.4 | 0000 0100 | | | | | | X | | | | | | | | X | | |
| 0.5 | 0101 | | | | | | X | | X | | | | | | X | | X |
| 0.6 | 0110 | | | | | | X | X | | | | | | | X | X | |
| 0.7 | 0111 | | | | | | X | X | X | | | | | | X | X | X |
| 0.8 | 1000 | | | | | X | | | | | | | | X | | | |
| 0.9 | 1001 | | | | | X | | | X | | | | | X | | | X |
| 1.0 | 1010 | | | | | X | | X | | | | | | X | | X | |
| 1.1 | 1011 | | | | | X | | X | X | | | | | X | | X | X |
| 1.2 | 1100 | | | | | X | X | | | | | | | X | X | | |

indicating the specific axis is arbitrary. In one application it was found that the omission of a pulse to terminal 441 was sufficient to clearly distinguish the information concerning this axis.

As the commutator continues to rotate contacts associated with section 406 are opened, and the contacts associated with 407 are closed. Closure of contacts associated with section 407 supplies power to relay 455 over lead 456 through the programmer section contacts and the closed contact of relay 425. Closure of relay 455 will operate all associated contacts *a* through *h*.

Since switches 458 through 464 are operated in accordance with the position of the stylus, when relay 455 is closed, power is transferred from line 423 through the closed switches to the output terminals 440 through 447. Table I is a comparative table of stylus movement in inches, the digital equivalent, the switch closure of switches 458 through 464, and the terminals 440 through 447 to which power is supplied.

In similar fashion the binary coded information relating to position of the stylus along the other axis is transferred to the punched tape if relay 427 has been closed by movement of the stylus along that axis. To provide the information that a new address is about to be transferred to the punched tape, relay 470 is closed by operation of programmer section 408 to punch holes in all binary digit columns except the column associated with terminal 440, from which power is omitted by the omission of a contact associated with lead 471. Again this coding is arbitrary. The only requirement is that the coding be non-ambiguous with respect to the coding of previous and subsequent addresses and information.

The utilization of a binary code to provide information pertaining to position of the stylus along mutually perpendicular axes, coupled with the advantage of a binary numbering system, makes it advantageous to use a binary code in the auxiliary equipment, 114 of FIGURE 1. Therefore, switches 475 through 482 FIGURE 4 are arranged to give a binary equivalent of the auxiliary information necessary for the particular application. For example, when it is desired to prepare a program tape for a punch press machine, the auxiliary equipment can be arranged to supply the punch size in binary form. For example, if a number 5 punch is to be used, switch 475, corresponding to a $2^0$ weighted binary digit, and switch 477, corresponding to a $2^2$ binary weighted digit, would be closed. It should be apparent to those skilled in the art that similar instructions can be given in binary form for any equivalent punch size or operation such as the selection of pin size to be set, hole size, or jaw pressure for shearing machines.

The transfer to the punch tape is made in identical fashion to that explained with respect to transfer of distance information. Again a relay 485 establishes what information is to follow by an unambiguous code. In this case, power is omitted from terminals 440 and 441. Operation of relay 485 is controlled by programmer section 410. Then the information concerning the desired operation is transferred to the tape through closure of contacts associated with programmer section 411.

With most programmed apparatus it is desirable to provide a method for indicating that the apparatus has been correctly positioned and the operation, such as punch size, selected, in order that the machine can complete the required operation. For this reason I have supplied means for providing an actuate signal on the punched tape. This actuate signal is provided by relay 486 which is powered from line 487 through the closed contacts of programmer section 412. Closure of the contacts of this relay supplies an arbitrarily coded, non-ambiguous signal to the tape puncher. In a particular embodiment shown I apply a signal to all terminals 440 through 447.

After the completion of a single cycle, it is desirable to reset the apparatus, placing it in a condition to translate new information. For this purpose, I have provided that a ground return for relays 425, 427 and 428 all pass through the normally closed contacts of commutator section 413. When this commutator section opens its contacts, the ground return is removed and the relays will open. Similarly the ground return for the holding coil of stylus 106 passes through the normally closed contacts of relay section 413. Therefore, when the relays have been reset, the stylus will be allowed to move upwards, removing power from relay 433, supplied through contacts *a* and *b*, thereby resetting the entire programmer.

Further rotation of the programmer will be stopped by the operation of catch 415 which will lock the single rotation clutch, preparing the programmer for subsequent operation.

It will of course be obvious to those skilled in the art that switches 420, 421 and 429 and relays 425, 427 and 428 may be changed by replacing the switches with a direct connection and removing the mentioned relays. In such an event each time the stylus is depressed address information and auxiliary operating information will be transferred to the punched tape. The circuitry as shown in FIGURE 4 has the advantage that unless the stylus is moved along one axis, the address for control of the programmed equipment along that aixs is not punched into the tape. Since most equipments which are programmed by the punched tape operate along a single axis unless specifically programmed to move from that line, the circuit shown in FIGURE 4 has the advantage of increasing machine operating speeds by omitting address information unless there has been an actual change in address.

Figure 5:
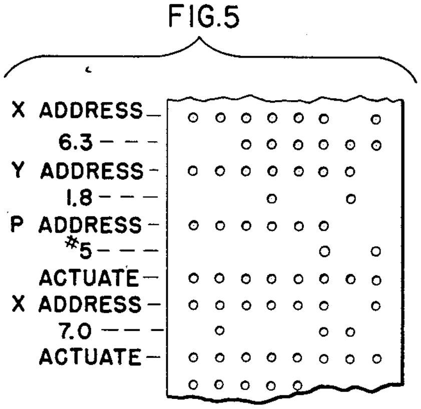
FIGURE 5 is a plan view of a punched tape produced by the apparatus shown in FIGURE 1.

An illustrative representative sample of punched tape produced by the embodiment of my invention described in connection with FIGURE 4 is shown in FIGURE 5. Along side each row of punched holes is a translation of the information conveyed in binary coded form.

It will be obvious to those skilled in the art that the switches schematically illustrated as 458 through 465 in FIGURE 4 and shown in section as 301 of FIGURE 3 may be in the form of switches having a mechanically moveable actuating arm or may easily be set up a brush contacts riding on printed circuit runs along the traverse bar and the side 108 of platform 101. In one embodiment, signal carrying printed circuit contacts were placed in the same position as the recesses illustrated in FIGURE 1. A brush contact was used instead of the follower 303 of the switch shown in FIGURE 3 to provide the signal to the output recorder in the same binary sequence as explained in connection with FIGURE 4.

Similarly, it will be obvious to those skilled in the art that, although I have explained the operation of one embodiment by illustrating usage by a standard 1, 2, 4, 8 binary code, equivalent sequences such as the Gray code, could be employed without deviating from the fundamental invention.

It will be apparent to those skilled in the art that in some applications, the operation of relays 450, 470 and 485 may be omitted. In this case, the distinction between punched information would be supplied from the tape sequence alone. However, it is often advisable to provide means for distinguishing between punched information so that fully automatic machinery, such as auto-loaders, may be programmed by the output tape.

Further, while I have particularly discussed the application to a 0.1-in. grid, because of it's current wide-spread use, and to a rectangular coordinate graphical display, it should be apparent to those skilled in the art that other grid spacings and other coordinate systems, such as spherical, may be employed without departing from the true spirit and scope of my invention.

While particular embodiments of the present invention have been shown and described, it will be apparent to those skilled in the art that changes and modifications may be made without departing from the invention in its broader aspects and, therefore, the aim in the appended claims is to cover all such changes and modifications as fall within the true spirit and scope of the invention.

What I claim as new and desire to secure by Letters Patent of the United States is:

1. An arrangement for translating points on a two coordinate graphical display into binary information comprising a grid having a pattern of incremental apertures therein spaced apart in predetermined increments and adapted to receive a graphical display in overlying relation, scanning means for scanning points on said display, a switching arrangement including first and second groups of switches to define respective coordinates of a point to be scanned in binary code, indexing means associated with said scanning means and movable to be inserted in a selected one of said apertures to index the scanning means to select the coordinates of a point to be scanned with relation to the graphical display and the incremental apertures, means interconnecting said scanning means and said switching arrangement for arranging said switching arrangement to define each coordinate value of the point to be scanned in binary code in accordance with the indexed position of the scanning means, and means to sequentially record the binary values defined by said switching arrangement.

2. An arrangement for translating points on a two coordinate graphical display into binary information comprising a grid having a pattern of incremental apertures therein spaced apart in predetermined increments and adapted to receive a graphical display in overlying relation, scanning means for scanning points on said display, a switching arrangement including first and second groups of switches to define respective coordinates of a point to be scanned in binary code, indexing means associated with said scanning means and movable to be inserted in a selected one of said apertures to index the scanning means to select the coordinates of a point to be scanned wtih relation to the graphical display and the incremental apertures, means interconnecting said scanning means and said switching arrangement for arranging said switching arrangement to define each coordinate value of the point to be scanned in binary code in accordance with the indexed position of the scanning means, recording means to sequentially record the binary values defined by said switching arrangement and means associated with said recording means for identifying the coordinate as well as the coordinate value in binary code.

3. An arrangement for translating points on a two coordinate graphical display into binary information comprising a grid having a pattern of incremental apertures therein spaced apart in predetermined increments and adapted to receive a graphical display in overlying relation, scanning means for scanning points on said display, a switching arrangement including first and second groups of switches to define respective coordinates of a point to be scanned in binary code, indexing means associated with said scanning means and movable to be inserted in a selected one of said apertures to index the scanning means to select the coordinates of a point to be scanned wtih relation to the graphical display and the incremental apertures, means interconnecting said scanning means and said switching arrangement for arrangig said switching arrangement to define each coordinate value of the point to be scanned in binary code in accordance with the indexed position of the scanning means, recording means to sequentially record the binary values defined by said switching arrangement, and means associated with said recording means for preventing the successive identification of a coordinate value in binary code of a selected point unless that coordinate value has changed from the coordinate value associated with a prior selected point.

4. An arrangement for translating points on a two coordinate graphical display into binary information comprising a grid having a pattern of incremental apertures therein spaced apart in predetermined increments and adapted to receive a graphical display in overlying relation, scanning means for scanning points on said display, a switching arrangement including first and second groups of switches to define respective coordinates of a point to be scanned in binary code, indexing means associated with said scanning means and movable to be inserted in a selected one of said apertures to index the scanning means to select the coordinates of a point to be scanned with relation to the graphical display and the incremental apertures, means interconnecting said scanning means and said switching arrangement for arrangig said switching arrangement to define each coordinate value of the point to be scanned in binary code in accordance with the indexed position of the scanning means, recording means to sequentially record the binary values defined by said switching arrangement, means associated with said recording means for identifying the coordinate as well as the coordinate value in binary code, and other means associated with said recording means for preventing the successive identification of a coordinate value in binary code of a selected point unless that coordinate value has changed from the coordinate values associated with a prior selected point.

5. An arrangement for translating points on a two coordinate graphical display into binary information comprising a grid having a plurality of incremental apertures therein spaced apart in predetermined increments and adapted to receive a graphical display in overlying relation, scanning means for scanning points on said display, a first and second switching arrangement each having a plurality of switch positions to define respective coordinates of a point to be scanned in binary code, indexing means associated with said scanning means and movable to be inserted in a selected one of said apertures to index the scanning means to select the coordinates of a point to be scanned with relation to the graphical display and the incremental apertures, first means interconnecting said scanning means and said first switching arrangement for arranging a first plurality of switch positions in a manner to define in binary code a first coordinate value of the point to be scanned in accordance with the indexed position of the scanning means, second means responsive to said first means for recording the binary value of said arranged first plurality of switch positions, third means to connect said scanning means and said second switching arrangement for arranging a second plurality of switch positions to define in binary code a second coordinate value of the point to be scanned in accordance with the position of the scanning means, and fourth means responsive to said third means for recording the binary value of said arranged second plurality of switch positions.

6. The invention of claim 1 in which the scanning means includes a traverse bar movable along a first axis, a slider on said traverse bar being movable along a second axis perpendicular to said first axis, said indexing means associated with said scanning means carried by said slider, said first group of switches carried by said traverse bar, said second group of switches carried by said slider, said interconnecting means including a means associated with said traverse bar and grid to actuate said first group of switches together with means associated with said slider and said traverse bar to actuate said second group of switches.

7. The invention of claim 6 in which said means associated with said traverse bar and grid to actuate said first group of switches includes a first plurality of code apertures in a predetermined binary arrangement to define one coordinate value of the point to be scanned in binary code, said means associated with said slider and said traverse bar includes a second plurality of code apertures in a predetermined binary arrangement to define the other coordinate value of the point to be scanned in binary code, and said switches are each provided with operating levers adapted to be received in respective ones of said code apertures to operate the switches in predetermined binary code combinations corresponding to the two co-ordinate positions of the indexing means.

References Cited in the file of this patent

UNITED STATES PATENTS

| | | |
|---|---|---|
| 407,581 | Dewey | July 23, 1889 |
| 2,168,047 | Skellett | Aug. 1, 1939 |
| 2,598,937 | Parker | June 3, 1952 |
| 2,672,605 | Taylor | Mar. 16, 1954 |
| 2,678,254 | Schenck | May 11, 1954 |
| 2,679,620 | Berry | May 25, 1954 |
| 2,705,105 | Paschen | Mar. 29, 1955 |
| 2,708,267 | Weidenhammer | May 10, 1955 |
| 2,714,204 | Lippel et al. | July 26, 1955 |
| 2,738,499 | Sprick | Mar. 13, 1956 |
| 2,792,987 | Stibitz | May 21, 1957 |

FOREIGN PATENTS

| | | |
|---|---|---|
| 19,593/96 | Great Britain | Oct. 4, 1897 |